US008744242B2

(12) United States Patent
Braun et al.

(10) Patent No.: US 8,744,242 B2
(45) Date of Patent: Jun. 3, 2014

(54) TIME STAMP CREATION AND EVALUATION IN MEDIA EFFECT TEMPLATE

(75) Inventors: Axel Braun, Wiesbaden (DE); Dirc Rose, Neckarsulm (DE); Frank Glatt, Karlsruhe (DE)

(73) Assignee: Nero AG, Karlsbad (DE)

( * ) Notice: Subject to any disclaimer, the term of this patent is extended or adjusted under 35 U.S.C. 154(b) by 252 days.

(21) Appl. No.: 13/228,203

(22) Filed: Sep. 8, 2011

(65) Prior Publication Data
US 2012/0063747 A1 Mar. 15, 2012

Related U.S. Application Data

(60) Provisional application No. 61/381,555, filed on Sep. 10, 2010.

(51) Int. Cl.
*H04N 5/93* (2006.01)
*G11B 27/00* (2006.01)

(52) U.S. Cl.
USPC ..................... 386/280; 386/E5.028

(58) Field of Classification Search
USPC ............................................ 386/280, E5.028
See application file for complete search history.

(56) References Cited

U.S. PATENT DOCUMENTS

| 5,353,391 | A | 10/1994 | Cohen et al. | |
|---|---|---|---|---|
| 6,546,188 | B1 | 4/2003 | Ishii et al. | |
| 2002/0176690 | A1 | 11/2002 | Nagasawa | |
| 2004/0004665 | A1* | 1/2004 | Kashiwa | 348/239 |
| 2004/0146275 | A1 | 7/2004 | Takata et al. | |
| 2006/0127036 | A1 | 6/2006 | Inoue et al. | |
| 2008/0019610 | A1 | 1/2008 | Matsuzaka et al. | |
| 2010/0150526 | A1* | 6/2010 | Rose et al. | 386/70 |

FOREIGN PATENT DOCUMENTS

| EP | 1377045 A2 | 1/2004 |
|---|---|---|
| WO | WO-2008/149367 | 12/2008 |

OTHER PUBLICATIONS

"New features in MuseScore 0.9.6", retrieved from http://musescore.org on Dec. 20, 2011, Jun. 7, 2010, 6 pages.
Ariza, C. , "Modeling Beats, Accents, Beams, and Time Signatures Hierarchically With Music21 Meter Objects", Proc. of the 2010 Int'l Computer Music Conference, Jun. 5, 2010, 8 pages.

(Continued)

*Primary Examiner* — Thai Tran
*Assistant Examiner* — Girumsew Wendmagegn
(74) *Attorney, Agent, or Firm* — Perkins Coie LLP; Michael A. Glenn

(57) ABSTRACT

A method of creating a template data structure for a media effect involving a media data item to be presented during a presentation of the media effect is disclosed. The method comprises: defining a time stamp for an event of the template data structure, the time stamp comprising a relative time stamp component indicating a time span within the presentation of the media data item as a portion of a duration of the presentation, and an absolute time offset component indicating a time span independent from the duration of the presentation. A related method defines the processing of a media data item to be presented during a presentation, the related method using the above mentioned time stamps to determine a temporal position of an event to occur during the presentation. A corresponding template creator, a media data processor, and a computer readable medium are also disclosed.

32 Claims, 12 Drawing Sheets

(56) References Cited

OTHER PUBLICATIONS

Lehman, A., "Maschineles Komponieren—Automatisiertes Berechnen von Mittelstimmen in einem Kantionalsatz mit Hilfe von MusicXML and SimpleXML", Humbold-Universitat, Berlin, document 36 pages, English translation 7 pages., May 31, 2007.

Stewart, D., "XML for Music", retrieved online from url: http://www.emusician.com/gear/0769/xml-for-music/140024, Dec. 1, 2003, 5 pages.

Anonymous, "MuseScore Version information", Apr. 18, 2013, XP055060159, Retrieved from the Internet: URL: http//musecore.org/en/developers-handbook/version-information [retrieved on Apr. 18, 2013].

Kainhofer, Reinhold, "A MusicXML Test Suite and a Discussion of Issues in MusicXML 2.0", In Proceedings of Linux Audio Conference 2010, May 4, 2010, XP055065542, Utrecht.

* cited by examiner

TIME STAMP CREATION AND EVALUATION IN MEDIA EFFECT TEMPLATE

CROSS-REFERENCE TO RELATED APPLICATIONS

This application claims priority to U.S. Patent Application No. 61/381,555 filed Sep. 10, 2010.

FIELD OF THE INVENTION

The field of the present invention relates to tools used for editing recordable presentations, such as tools for video editing, slideshow editing, or audio editing. The field of the invention relates to a method of creating a template data structure for a media effect involving at least one media data item to be presented during a presentation of the media effect. The field of the invention also relates to a method of processing one or more media data items using the template data structure. The field of the invention relates to a template creator for creating a template data structure and further to a media data processor for combining one or more media data items. The field of the invention further relates to a computer readable digital storage medium having stored thereon a computer program having a program code for performing, when running on a computer, a method of creating a template data structure or a method of processing one or more media data items.

BACKGROUND OF THE INVENTION

Recording equipment for various types of media, such as video, audio or both, have been a target of intensive research and development in the last decades. In the field of video recording, camcorders are available at very competitive prices to large parts of the population. Digital camcorders have attained a dominant market share, most likely due to their easy handling, low operating cost, and/or their ability to be connected a general purpose computing device, such as a personal computer or a notebook. Transferring recorded media data items to a personal computer (PC) offers a relatively comfortable and economic possibility to store, manage, and edit the recorded media data items to both professional users and amateurs. While basic editing tasks are typically easy to accomplish even for amateurs, more elaborate, artistic effects tend to require profound knowledge about video and/or audio editing techniques. Basic editing tasks may comprise selecting specific sections from one or several recorded media data items and combining the selected sections in a user-defined sequence to form a new media data item. Other editing tasks may involve applying an effect to one media data item (video, image, or graphic) and a background, wherein the background may be a pre-defined background, a user-defined background, or simply an empty screen. The more elaborate editing tasks may comprise arranging two or more media data items to be presented substantially simultaneously, such as a split screen effect or a picture-in-picture effect, or multitrack editing tasks in general.

To do single-track editing or multitrack editing—especially complex picture-in-picture effects with moving path animations on different tracks—is a time-consuming task for almost any type of user. The only option for achieving professional looking picture-in-picture (PiP) effects right now appears to involve a substantially manual configuration. This means that the user typically has to create a complex overlay project on several tracks. For each media data item or "clip" that the user wishes to use, the user typically needs to define the layer priority, a mark-in instant, a mark-out instant, a time related to the overall project and the relative timings of clips to be used within the PiP sequence. Furthermore, the user typically needs to adjust size, position, shadow, etc. via keyframes for each individual clip and the individual positions in the clips that the user wants to make use of within a PiP video sequence.

SUMMARY OF THE INVENTION

According to an embodiment, a method of creating a template data structure for a media effect involving at least one media data item to be presented during a presentation of the media effect may comprise an action of defining a timestamp for an event of the template data structure. The timestamp comprises a relative timestamp component and an absolute time offset component. The relative timestamp component indicates a time span within the presentation of the media effect as a portion of a (total) duration of the presentation of the media effect. The absolute time offset component indicates a time span independent from the (total) duration of the presentation of the media effect.

The method of creating the template data structure typically is performed by a computer of a template designer. The template designer may design an effect template and may then have his/her computer run the method of creating the template data structure. The computer running the method analyzes the template and the corresponding choices made by the template designer to create the template data structure. Time scalability of the template described by the template data structure typically is desired by end users of the template, because the end user typically will want to adjust the total duration of the presentation of the effect to a clip duration of one or more of the user-defined clips to be used for the media effect, instead of the other way around. This means that a temporal position of a certain event may depend on the total duration of the presentation of the media effect. On the other hand, a certain event may have a fixed temporal relation or distance to another event that should not be modified when the total duration of the presentation is chosen by the end user. The provision of the relative timestamp component and the absolute time offset component addresses these specifications. Thus, a user-created media effect created on the basis of the template data structure fits into the user-defined duration of the media effect while maintaining some timing relations that may be crucial for obtaining a desired sensation with a viewer of the finished presentation of the entire media effect. For example, a zooming in or out could be defined to last exactly a predetermined time span, regardless of the total duration of the presentation.

According to another embodiment, a method of processing one or more media data items to be presented substantially simultaneously in a defined relation to each other during a presentation of a media effect involving the at least one media data item may comprise: retrieving a template data structure; receiving a user-defined presentation duration and a presentation reference instant; determining a temporal position of the event; and inserting the event in a reference timeline. The template data structure comprises a timestamp for an event of the template data structure, and the timestamp comprises a relative timestamp component and an absolute time offset component. The relative timestamp component indicates a time span within the presentation of the at least one media data item as a portion of a (total) duration of the presentation of the media effect. The absolute time offset component indicates a time span independent from the (total) duration of the presentation. The presentation reference instant is provided with respect to a reference timeline to which the event is to be assigned. The determination of a temporal position of the event relative to the reference timeline comprises: determining a first time span by calculating a portion of the user-defined presentation duration, the portion being indicated by the relative timestamp component of the timestamp corresponding to the event under consideration; determining a second time span indicated by the absolute time offset component of the timestamp corresponding to the event; and adding the first time span and the second time span to the presentation reference instant to obtain the temporal position of the event. The processing of the at least one media data item may comprise combining the at least two media data items and processing the at least two media data items according to an event-related, defined relation to obtain a result of the event. The inserting of the result of the event in the reference timeline is done at the obtained temporal position of the event.

The method of combining one or more media data items automatically adjusts the temporal positions of the various events that are defined by the template data structure to a user-defined presentation duration, while maintaining certain time spans defined in the template data structure at their original length. With the combined usage of the relative timestamp component and the absolute time offset component within the timestamps for the events defined by the template data structure, the media effect based on the template data structure can be adjusted in its duration, while a characteristic and desired "look-and-feel" of the media effect is maintained.

According to another embodiment, a template creator for creating a template data structure for a media effect involving at least one media data item to be presented during a presentation of the media effect comprises a timestamp processor adapted to define a timestamp for an event of the template data structure. The timestamp comprises a relative timestamp component indicating a timestamp within the presentation of the at least one media data item as a portion of a (total) duration of the presentation, and an absolute time offset component indicating a time span independent from the (total) duration of the presentation. The timestamp processor is adapted to assign the defined timestamp to a given event and to set the relative timestamp component in the absolute time offset component of the timestamp to normalized values valid for the given event.

According to another embodiment, a media data processor for processing one or more media data items to be presented during a presentation of the at least one media data item may comprise a template retriever, an interface for receiving a user-defined presentation duration and a presentation reference instant with respect to a reference timeline to which an event is to be assigned; a timestamp evaluator; a media processor; and an event inserter. The template retriever is adapted to retrieve a template data structure comprising a timestamp for an event of the template data structure. The timestamp comprises a relative timestamp component indicating a time span as a portion of a (total) duration of the presentation of the media effect, the time span being within the presentation of the media effect of the at least one media data item. The timestamp also comprises an absolute time offset component indicating a time span independent from the (total) duration of the presentation of the media effect. The interface is used and adapted for receiving a user-defined presentation duration and a presentation reference instant with respect to a reference timeline to which the event is to be assigned. The timestamp evaluator is adapted to determine a temporal position of the event relative to the reference timeline. The timestamp evaluator is also adapted to determine a first time span by calculating a portion of the user-defined presentation duration, the portion being indicated by the relative timestamp component of the timestamp corresponding to the event. Furthermore, the timestamp evaluator is adapted to determine a second time span indicated by the absolute time offset component of the timestamp corresponding to the event and further adapted to add the first time span and the second time span to the presentation reference instant to obtain the temporal position of the event with respect to the reference timeline. The media processor is adapted to process the at least one media data item according to an event-related, defined relation to obtain a result of the event and/or the media effect. The event inserter is adapted to insert the result of the event in the reference timeline at the obtained temporal position of the event.

According to two other embodiments, computer readable digital storage media may have stored thereon computer programs having program codes for performing, when running on a computer, at least one of the method of creating a template data structure and the method of processing one or more media data items.

In embodiments of the teachings disclosed herein, the media effect may involve at least two media data items to be presented substantially simultaneously in a defined relation to each other.

In embodiments of the invention, a determination of an event type may be performed. This may be based on determining whether a given event is to occur at a temporal position that is defined as a fraction of the (total) duration of the presentation, or whether the given event is to occur at a certain temporal distance from another event. The relative timestamp component and the absolute time offset component of the timestamp corresponding to the given event may be set as a function of a result of the determination.

In embodiments of the invention the determination of the event type may be based on a heuristic. The heuristic may analyze all (or some) timestamps of a designed media effect (start and end times, keyframes, effect times, etc.). The start and end times of e.g. a video track may be considered as "master" times. Other timestamps in the vicinity of such master times tend to be bound to the master time, e.g. they are located at absolute offsets to the corresponding master time. The master time itself can also be bound to other master times. The heuristic may for example group two or more events together that define a basic effect, such as a fade-out or a zoom. The heuristic may then retrieve information as to whether the basic effect should be time-scalable or rather have a fixed duration. If the heuristic finds out that the basic effect should be time-scalable, then the timestamps corresponding to the basic effect are made dependent on the total duration of the media effect and the absolute time offset components are set to zero. In the contrary case, at least one timestamp is defined to maintain a fixed time distance to another timestamp. The heuristic could comprise a database and/or it could be self-learning by evaluating corrections introduced by e.g. a template designer in order to correct automatically determined timestamps.

In embodiments of the teachings disclosed herein the setting of the relative timestamp component and the absolute time offset may comprise: identifying at least one major event of the template data structure, determining a temporal distance between the given event and the major event; comparing the determined temporal distance with a threshold; setting the relative timestamp component of the given event equal to the relative timestamp component of the major event; and setting the absolute time offset component of the given event equal to the determined temporal distance if the determined temporal distance is less than the threshold. In an alternative case, i.e. if the determined temporal distance is greater than or equal to the threshold, the relative timestamp component of the given event may be set equal to a portion of the total duration of the presentation, the portion corresponding to the temporal position of the given event, and the absolute time offset component may be set equal to zero.

In embodiments of the invention at least two major events may have different priorities or ranks and the timestamp of a lower prioritized major event of the at least two major events is defined as a function of a higher prioritized major event of the at least two major event.

In embodiments of the invention a keyframed effect may be defined to be executed within the media effect. A keyframed effect start time and a keyframed effect stop time may be defined in the format of the timestamp for an event. A time difference between the keyframed effect stop time and the keyframed effect start time may yield a keyframed effect duration. Furthermore, a keyframe timestamp of a keyframe within the keyframed effect may be defined. The keyframe timestamp comprises a relative timestamp component indicating a time span within the keyframed effect as a portion of the keyframed effect duration and an absolute time offset component indicating a time span independent from the keyframed effect duration.

In embodiments of the invention a placeholder may be defined for a reference to one of the at least one media data item. The placeholder may comprise a reference to a default media data item adapted to be replaced with the reference to said media data item upon a corresponding action of a user of the template data structure.

In embodiments of the invention the media effect may comprise at least one of: a picture-in-picture effect, a cross-fade effect, a split-screen effect, a dissolve effect, an overlay effect, a superimposed effect, and an effect with a single media data item and a background.

In embodiments relative to the processing of one or more media data items, the determining of the temporal position of the event relative to the reference timeline may comprise evaluating the following formula:

$$t_{EVENT} = t_{INSER\ POSITION} + x \cdot t_{MEDIA\ EFFECT\ DURATION} + y,$$

where $t_{EVENT}$ is the temporal position of the event relative to the reference timeline, $t_{INSERT\ POSITION}$ is the presentation reference instant, x is the relative timestamp component, y is the absolute time offset component, and $t_{MEDIA\ EFFECT\ DURATION}$ is the user-defined duration of the media effect that is defined by the template.

In embodiments of the invention the media effect may comprise a keyframed effect to be executed during the presentation. A keyframed effect start timestamp, a keyframed effect stop timestamp, and a keyframe timestamp of a keyframe within the keyframed effect may be retrieved from the template data structure. The keyframed effect start time and the keyframed effect stop time may be determined in a manner analog to the determining of the temporal position of the event relative to the reference timeline. The keyframe time stamp may be evaluated by first determining a keyframed effect duration as a function of the keyframed effect stop time and the keyframed effect start time, and then by determining a third time span by calculating a portion of the keyframed effect duration. The portion is indicated by the relative timestamp component of the keyframe timestamp. A fourth time span indicated by the absolute time offset component of the keyframe timestamp is determined and then the third time span and the fourth time span are added to the keyframed effect start time to obtain a temporal position of the keyframe relative to the reference timeline.

In embodiments of the invention the media effect may comprise a standard effect. Timestamps of standard effect events occurring during the standard effect may be evaluated by determining a standard effect start time, a standard effect stop time, and a standard effect duration as a function of the user-defined media effect duration and the media effect instant with respect to the reference timeline. Relative time indications defined in the timestamps for the standard effect event may be evaluated as a function of the standard effect duration.

In embodiments of the invention relative to the processing of one or more media data items, a reference to a user-defined media data item and an information about a user-defined target for the user-defined media data item may be received. A placeholder corresponding to the user-defined target in the template data structure may be searched and the placeholder may be replaced with a reference to the user-defined media data item.

According to embodiments of the invention, the timing of e.g. a keyframed effect (i.e. an effect that uses a keyframe to define movements, transitions, changes in brightness, color, etc.) may be defined by an effect designer and is typically preserved when the keyframe effect is used in a media effect. For the timing of the keyframes within the keyframed effect, the determining variable is the duration of the keyframed effect. The duration of the keyframed effect may, in turn, depend on the duration of the media effect or not. This may be defined by the media effect designer or left up to the heuristic mentioned above. Thus it is possible to include already existing (keyframed) effects to build a larger media effect.

In embodiments of the invention the search for the placeholder in the template data structure may simply search for a characteristic data pattern such as a keyword. The replacing of the placeholder with the reference to the user-defined media data item may be to insert said reference (e.g. a path in a file system and a file name) at the place in the template data structure where the placeholder used to be. It is not necessary to parse the entire template data structure.

BRIEF DESCRIPTION OF THE DRAWINGS

Embodiments of the invention will be described referring to the accompanying drawings, in which.

DETAILED DESCRIPTION OF THE INVENTION

Figure 1:
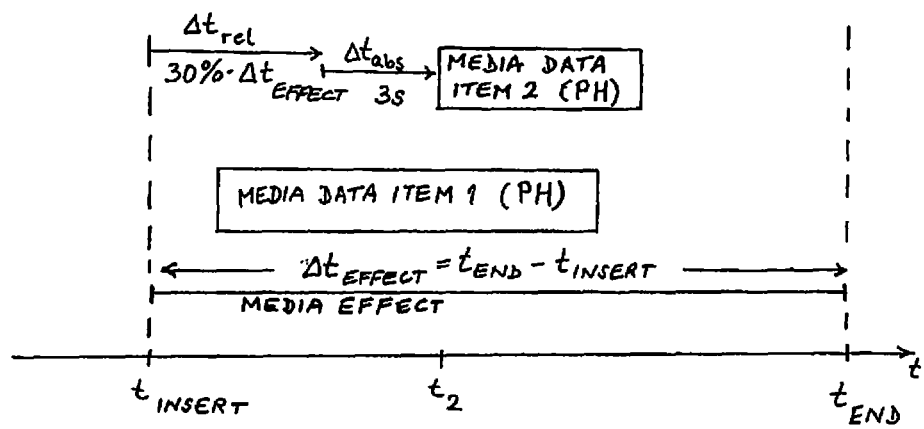
FIG. 1 shows a schematic time diagram illustrating the internal timing of a media effect.

FIG. 1 shows a schematic time diagram of a media effect and two placeholders for media data items that are to be presented simultaneously at least during a part of the duration of the media effect. An eventual presentation of the media effect will take place between an insertion instant $t_{insert}$ and an end instant $t_{end}$. The media effect duration $\Delta t_{effect}$ is defined as the time difference between the end instant and the insertion instant, e.g. $\Delta t_{effect} = t_{end} - t_{insert}$. The media effect typically is designed by an effect designer. At the time of designing the media effect, the effect designer does not know which duration the presentation of the media effect will have once an end-user employs the media effect for one of his/her media editing projects. At the time of designing the media effect, the duration of the media effect may be regarded as an unknown variable. Not withstanding, the effect designer may use a default duration e.g. for defining and testing the media effect.

The media effect shown in FIG. 1. comprises two placeholders (PH) for a media data item, respectively. The placeholder for media data item 2 begins at an instant $t_2$. The instant $t_2$ is defined by a timestamp which comprises a relative timestamp component and an absolute time offset component. The relative timestamp component is shown in FIG. 1 as the arrow referenced by $\Delta t_{rel}$. As an example, it has been assumed for the purpose of FIG. 1 that the relative timestamp component amounts to 30% of the media effect duration $\Delta t_{effect}$. The absolute time offset component is shown in FIG. 1 as the arrow referenced by $\Delta t_{abs}$ and amounts to three seconds independent from the media effect duration.

Figure 2:
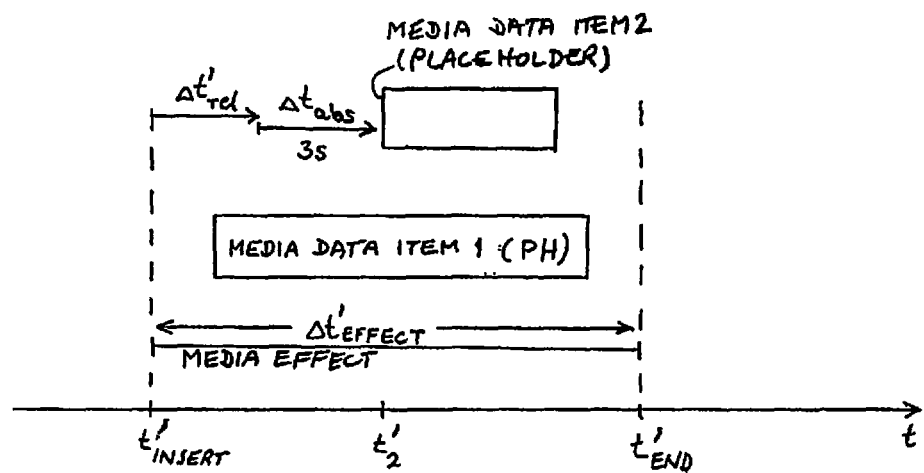
FIG. 2 shows a schematic timing diagram similar to FIG. 1, but for a different media effect duration.

FIG. 2 shows the situation after the media effect duration has been changed to a new value $\Delta t'_{effect}$, for example by a user of the template data structure in order to make the media data effect fit into his/her media editing project. Typically, the user also adjusts the insertion instant to a new value $t'_{insert}$ and as a consequence also the end instant and the instant of the beginning of the placeholder for media data item 2 are changed to $t'_{end}$ and $t'_2$, respectively. Note that the same would happen to the placeholder for media data item 1, although this is not explained or illustrated in FIGS. 1 and 2. Occasioned by the modification of the media effect duration, the relative timestamp component of the timestamp for the placeholder for media data item 2 is changed to a new value $\Delta t_{rel}$ to 30% of the new media effect duration data $t'_{effect}$. The absolute time offset component $\Delta t_{abs}$ on the other hand was not modified and is still 3 seconds.

The media effect designer has the possibility to decide whether certain time instances within the media effect should be a function of the media effect duration or rather be defined as an absolute time offset from another time instant, or a combination of both. This also gives the media effect designer the possibility to define whether time intervals within the media effect should be stretched or compressed in proportion to a stretching or compression of the media effect duration. The absolute time offset component may be negative, which means that the time instant of the corresponding event is prior to another time instant used as the starting point for the absolute time offset.

Figure 3:
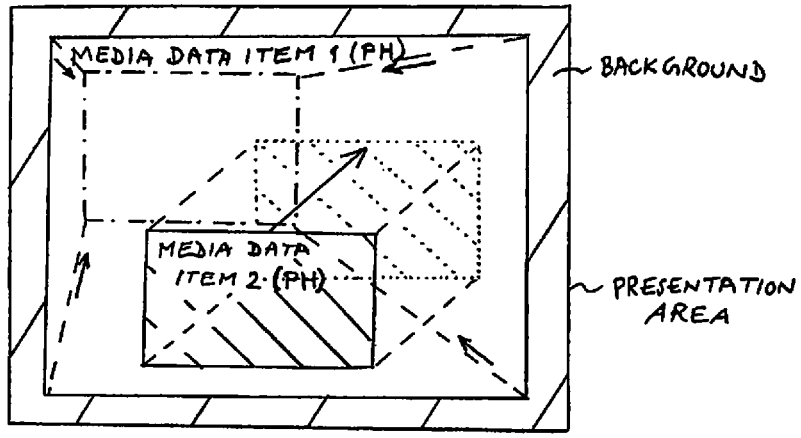
FIG. 3 shows a graphical representation of an exemplary media effect.

FIG. 3 shows a result of a purely exemplary media effect involving two media data items. Under the assumption that the media data effect is a visual effect, the result will be presented in a presentation area, such as a screen of a PC or a notebook. The media data items 1 and 2 could be still images, video clips, backgrounds, graphics, animated graphics, or the like that may be inserted to respective placeholders for media data items 1 and 2. The placeholder (PH) for media data item 1 starts out with a size covering almost the entire presentation area. During the progression of the media effect, the placeholder for media data item 1 shrinks to about a quarter of its original size and is located in the upper left corner of the presentation area. The placeholder for media data item 2 on the other hand does not change its size, but moves from a bottom center position to a center-right position within the presentation area. The initial states of the placeholders for media data items 1 and 2 are drawn in continuous line, while the end positions are drawn in dash-dot line and dot line, respectively. The media effect may further define a background, such as another still image, a video clip, a color, or a pattern.

Figure 4:
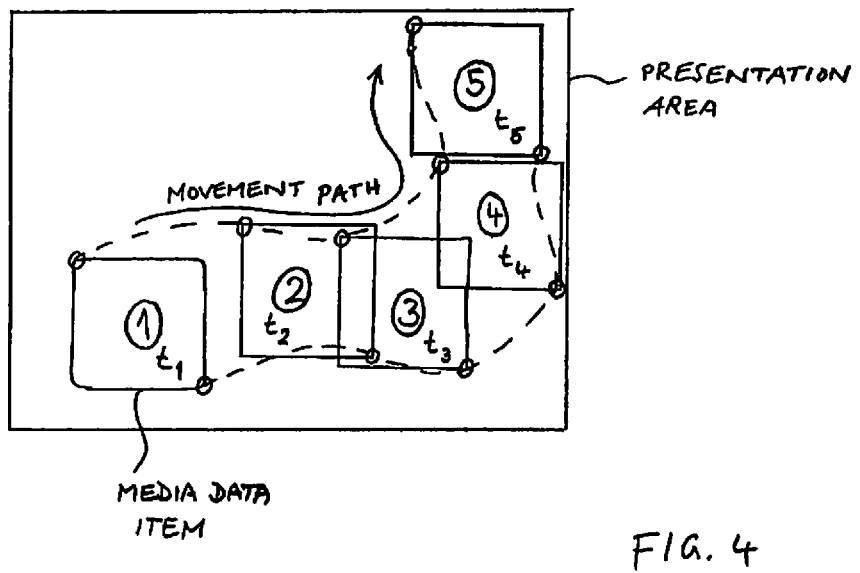
FIG. 4 shows a graphical representation of another exemplary media effect.

FIG. 4 shows a result of another media effect where a movement path for a placeholder for a media data item is defined using keyframes. Five keyframes have been defined occurring at the time instants $t_1$, $t_2$, $t_3$, $t_4$, and $t_5$, respectively. The five time instants $t_1$ to $t_5$ are typically also defined in the form of time stamps and hence offer the media effect designer the possibility to decide whether they should be defined to depend on the media effect duration, or not.

Further options include combining only one user-defined media data item with a predefined background graphic or presenting a single media data item with no background graphic at all. For example:

Designer-provided background graphic and one or more user-defined media data items, No designer background graphic, i.e. a designer-defined overlay animation pattern is combined with a user-defined background and a user-defined media data item, No background at all, only one media data item provided by the user: A designer may define e.g. an animation of a single media data item.

Figure 5:
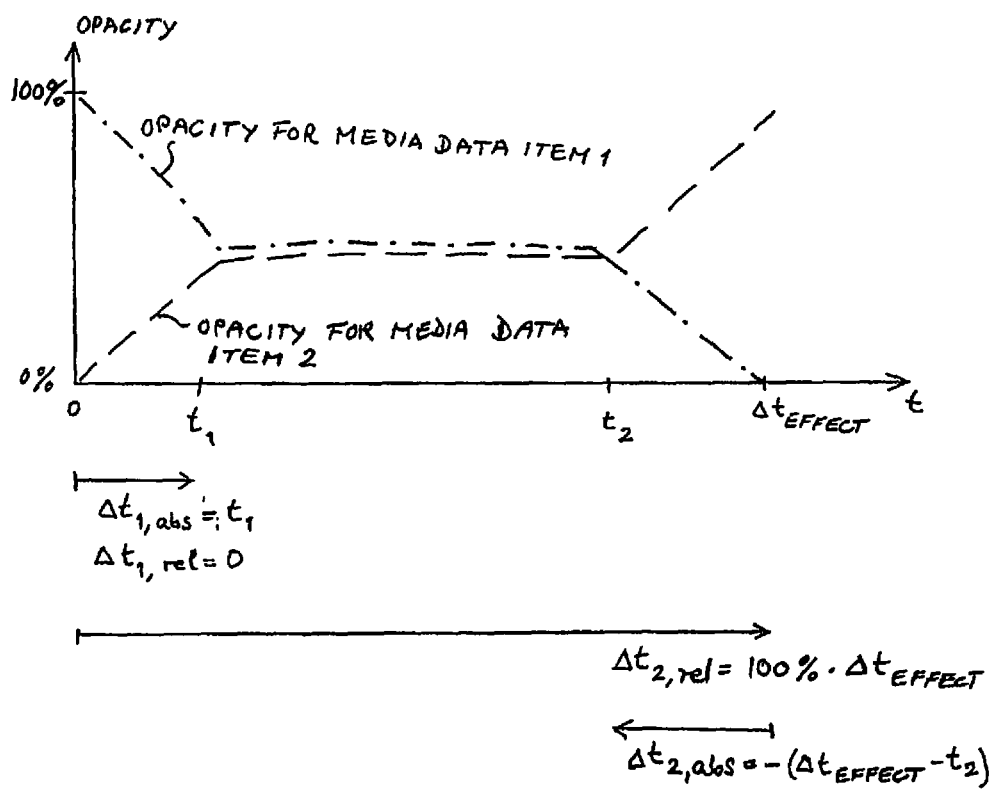
FIG. 5 shows a schematic time diagram of properties of two media data items.

FIG. 5 shows a time diagram illustrating the instantaneous opacity for media data item 1 and 2 over the course of the media effect. The opacity for media data item 1 starts out at 100% and decreases linearly to approximately 50% at a time instant $t_1$. The opacity remains at approximately 50% until the time instant $t_2$ and then decreases linearly to zero towards the end of the media effect. The opacity for media data item 2 basically does the inverse, i.e. a linear increase in the time interval $[0, t_1]$, a constant value of approximately 50% in the time interval $[t_1, t_2]$, and a further linear increase from $t_2$ to $\Delta t_{effect}$. For this linear effect the media effect designer decided to assign fixed durations to the intervals $[0, t_1]$ and $[t_1, \Delta t_{effect}]$ in which the linear opacity changes occur. Thus, the relative timestamp component for the time instant $t_1$ is zero and the absolute time offset component is equal to $t_1$. This means that the time instant $t_1$ will always be at a fixed temporal distance from the beginning of the media effect. Similarly, the time instant $t_2$ is always at a fixed temporal distance from the end of the media effect. The relative timestamp component is 100%, i.e. the end of the media effect. The absolute time offset component is a negative number equal to the temporal distance between $t_2$ and $\Delta t_{effect}$.

Figure 6:
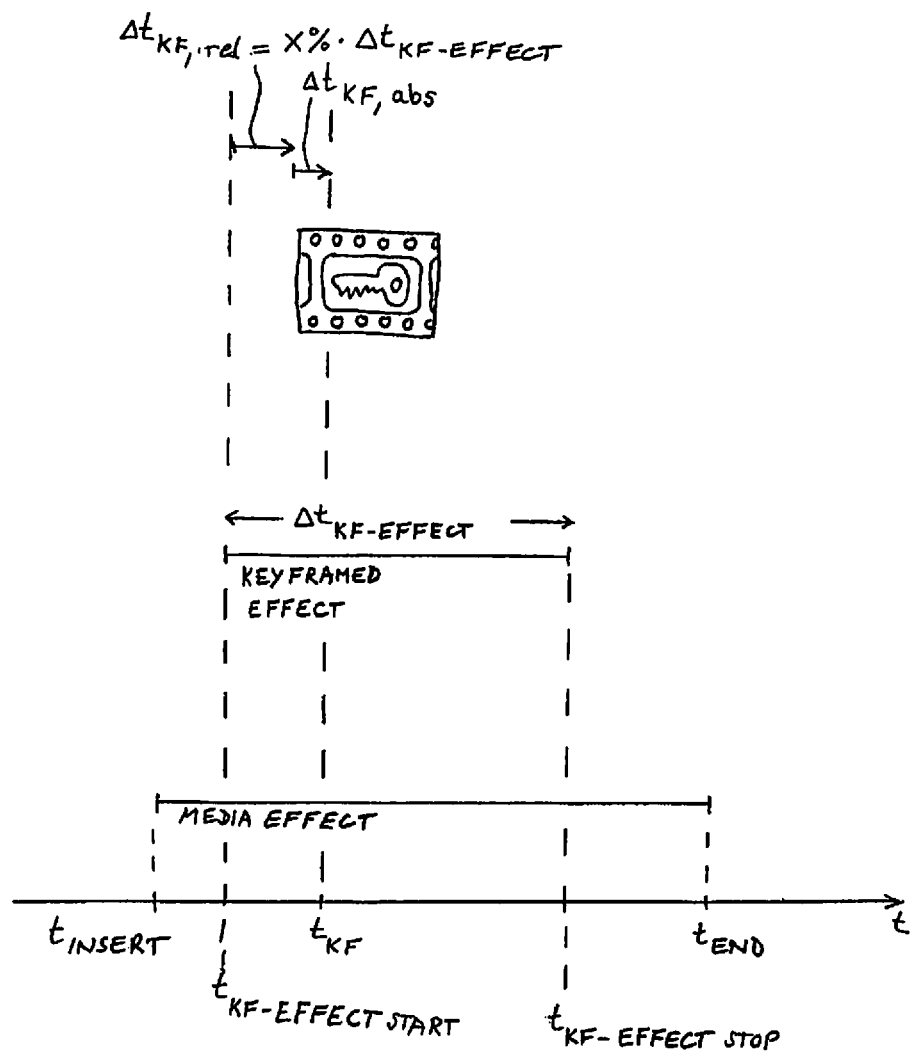
FIG. 6 shows a schematic time diagram illustrating the timing within a keyframed effect.

FIG. 6 shows how time instants defined within a keyframed effect may be defined and calculated. A keyframed effect is an effect that uses keyframes to time certain actions within the keyframed effect. FIG. 6 illustrates one of these keyframes occurring at $t_{KF}$. Typically, the time instant(s) of the keyframe(s) is/are carefully adjusted to achieve a certain aesthetic effect. A keyframed effect duration $\Delta t_{KF\text{-}effect}$ may influence the time instant of the keyframe $t_{KF}$. Thus, the relative timestamp component for the keyframe is defined and eventually evaluated according to the following formula:

$$\Delta t_{KF,rel} = x\% \cdot \Delta t_{KF\text{-}effect}$$

An absolute time offset component of the keyframe $\Delta t_{KF,abs}$ is substantially identical to the above mentioned absolute time offset component.

The keyframed effect duration $\Delta t_{KF\text{-}effect}$ may be determined by evaluating a keyframed effect start time $t_{KF\text{-}effect\,start}$ and a keyframed effect stop time $t_{KF\text{-}effect\,stop}$.

Figure 7:
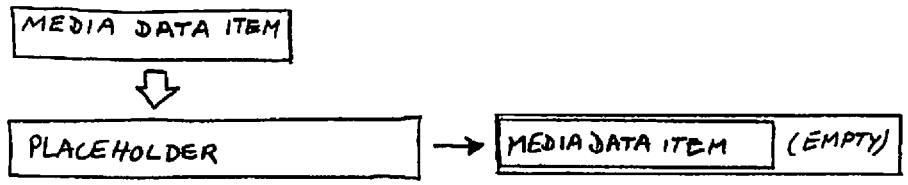
FIGS. 7 to 10 show various options for inserting a media data item into a timeslot defined by a placeholder.
Figure 8:
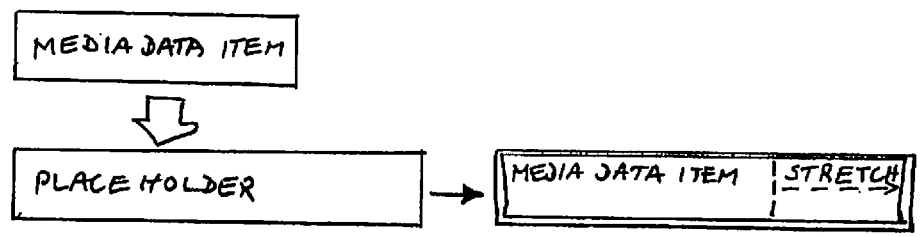
Figure 9:
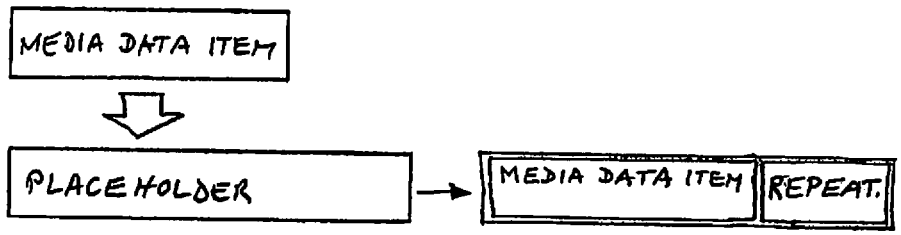
Figure 10:
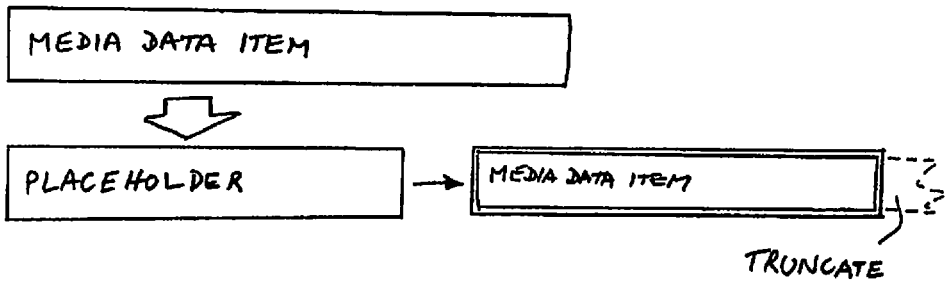

FIGS. 7 to 10 show various exemplary options for inserting a media data item to a timeslot reserved by a placeholder within the media effect. In FIG. 7, the media data item is shorter than the timeslot reserved by the placeholder. After insertion, the media data item fills a duration corresponding to its length and the remainder of the timeslot remains empty. In FIG. 8, the media data item is again shorter than the timeslot, but after insertion the media data item is stretched to fill the timeslot. This would result in a slow motion effect for the media data item. It would also be possible to compress the media data item, if the media data item is longer than the time slot defined by the placeholder, resulting in a time-lapse effect for the media data item. In FIG. 9 the media data item is repeated to fill up the remaining time in the timeslot. Any number of repetitions may be inserted until the length of the timeslot is filled up (the last repetition may be truncated). As a further option, every other repetition could be played in a reverse playing direction, i.e. from the end to the beginning so that the overall effect would be an oscillating behavior or a seesaw behavior. In FIG. 10 an option is shown how to handle a media data item that is too long for the timeslot defined by the placeholder. The media data item is simply truncated at the end so that it fits into the timeslot.

Figure 11:
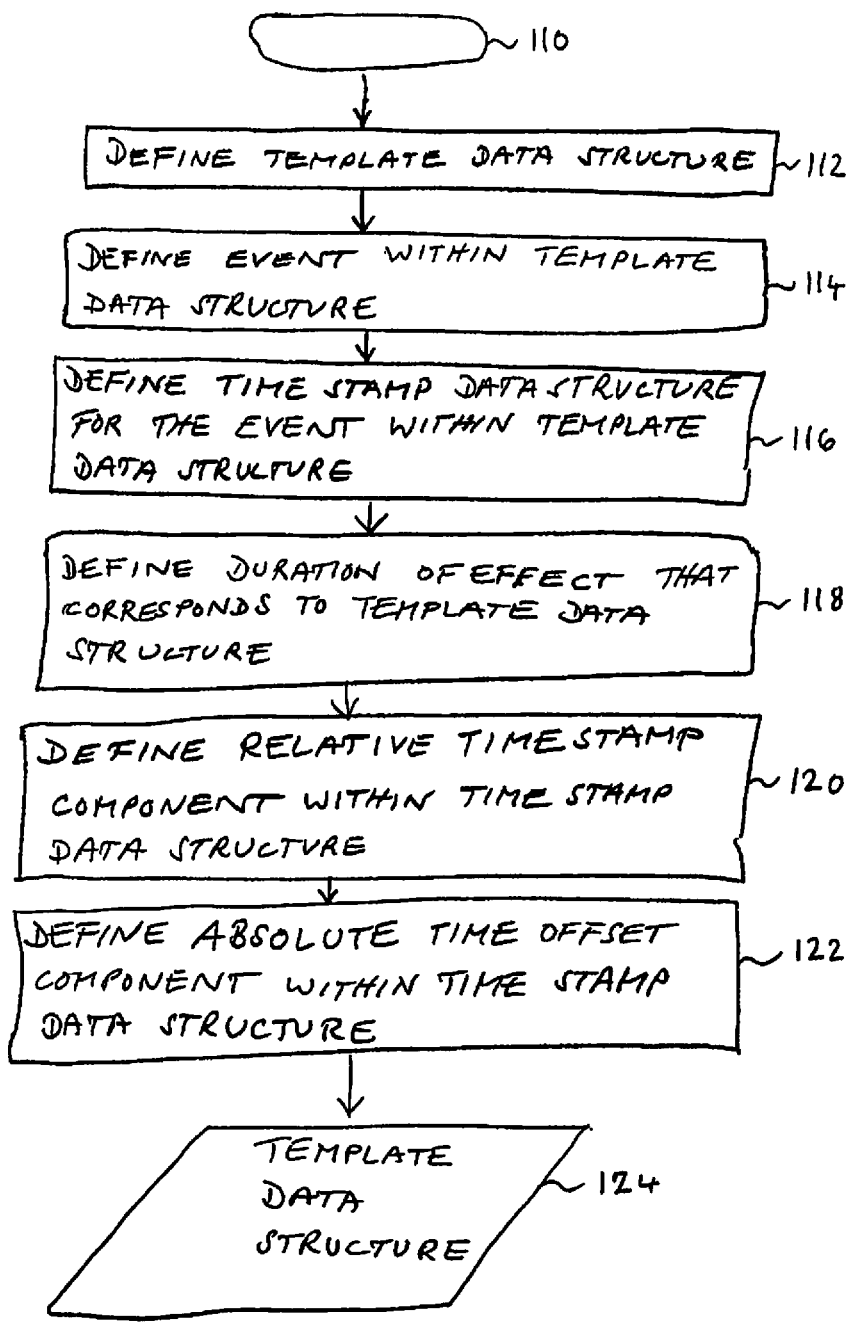
FIG. 11 shows a schematic flowchart of a method of creating a template data structure according to the teachings disclosed herein.

FIG. 11 shows a schematic flow chart of a method of creating a template data structure for a media effect involving at least two media data items. The method may be run from a computer and has a technical effect of automatically defining timestamps for events covered by the template data structure in a way that adjustments to for example the media effect duration performed later by a user have an intended effect on the subsequent evaluation of the timestamp. After the start of the method at 110, the template data structure is defined at 112. Defining the template data structure may comprise setting a media effect that is supported by the template data structure and/or assigning an identifier for the media effect. Furthermore, the template data structure definition may comprise the storing of information relative to the relation the two or more media data items and possibly how this relation should evolve over time during an execution of the media effect. For example, the spatial arrangement of two image frames in which still images or video clips can be presented, may be defined within the template data structure (cf. FIGS. 3 and 4).

Typically, the template data structure comprises at least one event. The event(s) is/are defined at 114. The begin and the end of the media effect may be considered as events. A mark-in instant for one of the media data items may be considered as an event, too. At 116 a timestamp data structure for the event is defined within the template data structure. Typically, an event is tied to a specific time instant or a time interval. In both cases, at least one timestamp needs to be defined. A media effect duration is defined at 118 of the media effect that corresponds to the template data structure.

At an action 120 of the method of creating a template data structure a relative time span component is defined within the timestamp data structure. At an action 122 an absolute time offset component is defined within the timestamp data structure. The method ends with a complete template data structure 124 that may be output or stored to be used later by a user who desires to use the media effect defined by the template data structure for one of his/her media editing projects.

Figure 12:
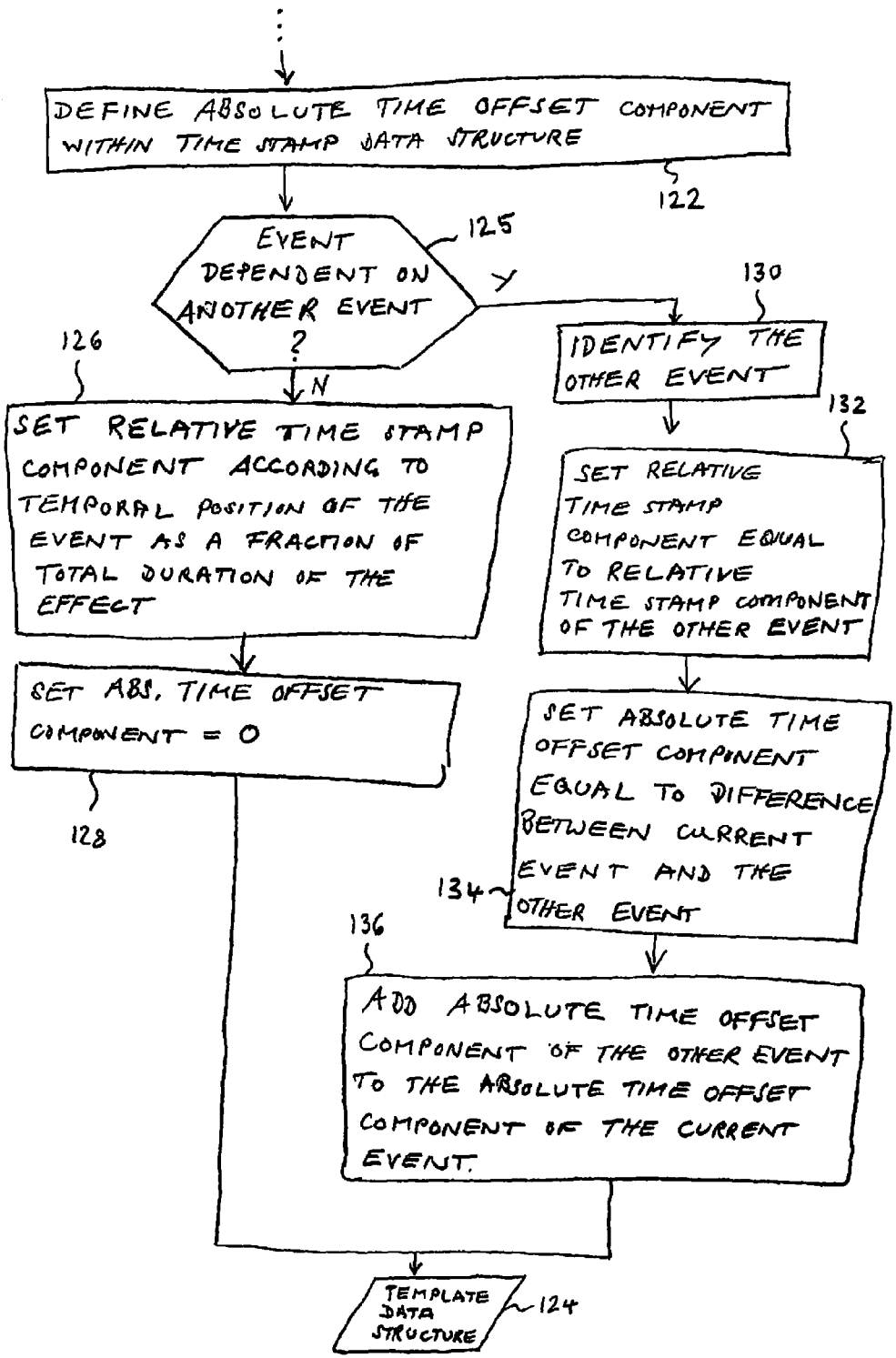
FIG. 12 shows a schematic flowchart of the method of creating a template data structure according to an embodiment of the teachings disclosed herein.

An optional enhancement to the method of creating a template data structure shown in FIG. 11 is illustrated in FIG. 12. Subsequent to the action 122 of defining an absolute time offset component within the timestamp data structure, a query 125 is made as to whether the event under consideration is dependent on another event. If the event under consideration is not dependent on another event, the relative timestamp component of the corresponding timestamp is set according to a temporal position of the event as a function of the total duration of the media effect. Thus, any user-defined changes to the media effect duration will effect the timestamp of the event under consideration, which is assumed to be the desired effect, because the event does not depend on another event (it depends only loosely on the start time of the media effect and the end time of the media effect). The setting of the relative timestamp component is done at action 126. At 128 the absolute time offset component is set to zero.

If at the query 125 the event is identified to depend on another event, then said other event is identified at 130. The relative timestamp component of the event under consideration is set equal to the relative timestamp component of the other event. In this manner, the relative timestamp components of the event under consideration and the other event react identically to any user-defined modifications to the media effect duration. The absolute time offset component is set equal to the difference between the current event and the other event at an action 134. Since the absolute time offset component is not affected by user-defined changes to the media effect duration, the time difference between the current event and the other event remains constant. At 136 the absolute time component of the other event is added to the absolute time offset component of the current event as determined at 134. Indeed, the other event may itself depend on yet another and this dependency is then reflected by a non-zero absolute time offset component of the other event.

In both cases distinguished by the query at 125 the method ends at 124 with the template data structure.

Figure 13:
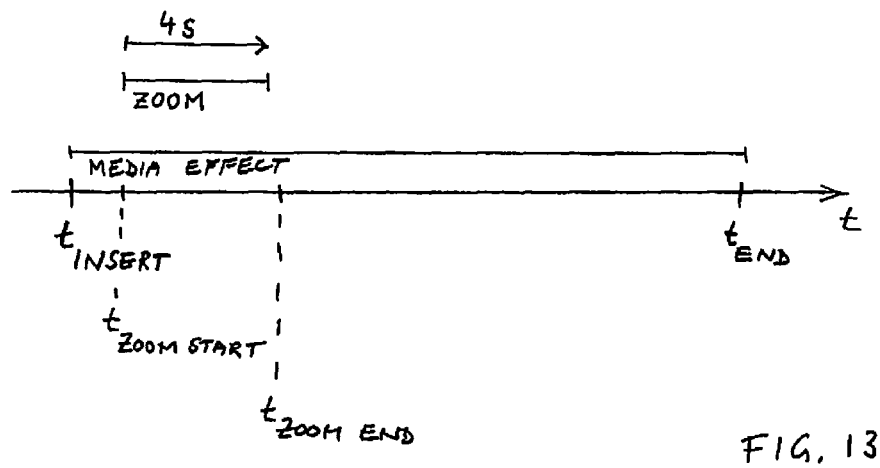
FIG. 13 shows a schematic time diagram illustrating the concept of an event that is bound to another event.

FIG. 13 illustrates how two events within the media effect can depend on each other, or rather one of the two events depends on the other event. In FIG. 13, a zoom process for one of the media data items starts at $t_{zoom\,start}$ and ends at $t_{zoom\,end}$. In order to achieve a desired sensation with a viewer of the media effect, the zoom shall be performed within four seconds in this example. This can be achieved by making the end instant of the zoom $t_{zoom\,end}$ dependent on the start instant of the zoom $t_{zoom\,start}$. Accordingly, the absolute time offset component for $t_{zoom\,end}$ is set to four seconds and the relative timestamp component of $t_{zoom\,end}$ is set to the same value as the relative timestamp component for $t_{zoom\,start}$.

Figure 14:
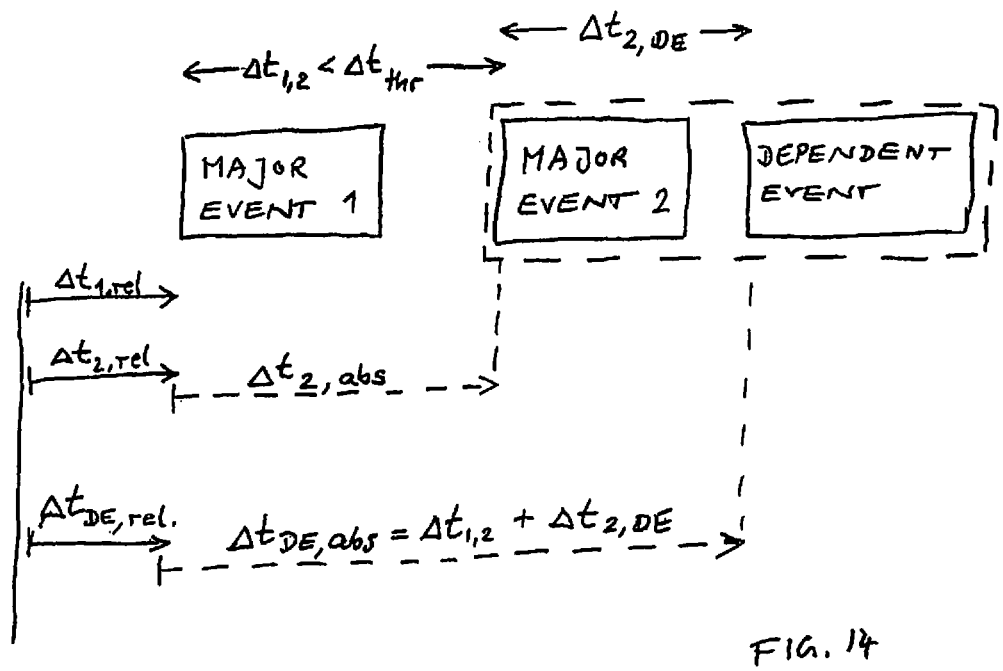
FIG. 14 illustrates major events of different priorities and a dependent event, as well as their mutual relations.

In FIG. 14 a case involving two major events and one dependent event is illustrated. A major event 1 has a priority higher than a major event 2 shown in FIG. 14. Furthermore, the major event 2 and the dependent event form a group of events that is linked together as indicated by the dashed box. A temporal distance between the major event 1 and the major event 2 is $\Delta t_{1,2}$. This temporal distance $\Delta t_{1,2}$ is smaller than a threshold $\Delta t_{thr}$ which indicates that the lower prioritized major event 2 is bound to the higher-prioritized major event 1. A temporal distance between the major event 2 and the dependent event $\Delta t_{2, DE}$ is also shown in FIG. 14.

The timestamps of the three events shown in FIG. 14 are defined as follows. The major event 1 occurs at a time instant defined by the relative timestamp component. The absolute time offset component for major event 1 is zero (not depicted in FIG. 14). Since the major event 2 depends on the major event 1, its relative timestamp component $\Delta t_{2, rel}$ is equal to the relative timestamp component of major event 1 $\Delta t_{1, rel}$. Furthermore, the absolute time offset component $\Delta t_{2, abs}$ is set equal to the temporal distance $\Delta t_{1, 2}$ between the major event 1 and the major event 2. As to the dependent event, the relative timestamp component $\Delta t_{DE, rel}$ is again equal to the relative timestamp component $\Delta t_{1, rel}$ of the major event 1 and also to the relative timestamp component $\Delta t_{2, rel}$ of the major event 2. The absolute time offset component $\Delta t_{DE, abs}$ is equal to the sum of the temporal distances between the major event 1 and the major event 2 and the major event 2 and the dependent event, hence $\Delta t_{DE, abs} = \Delta t_{1, 2} + \Delta t_{2, DE}$.

Figure 15:
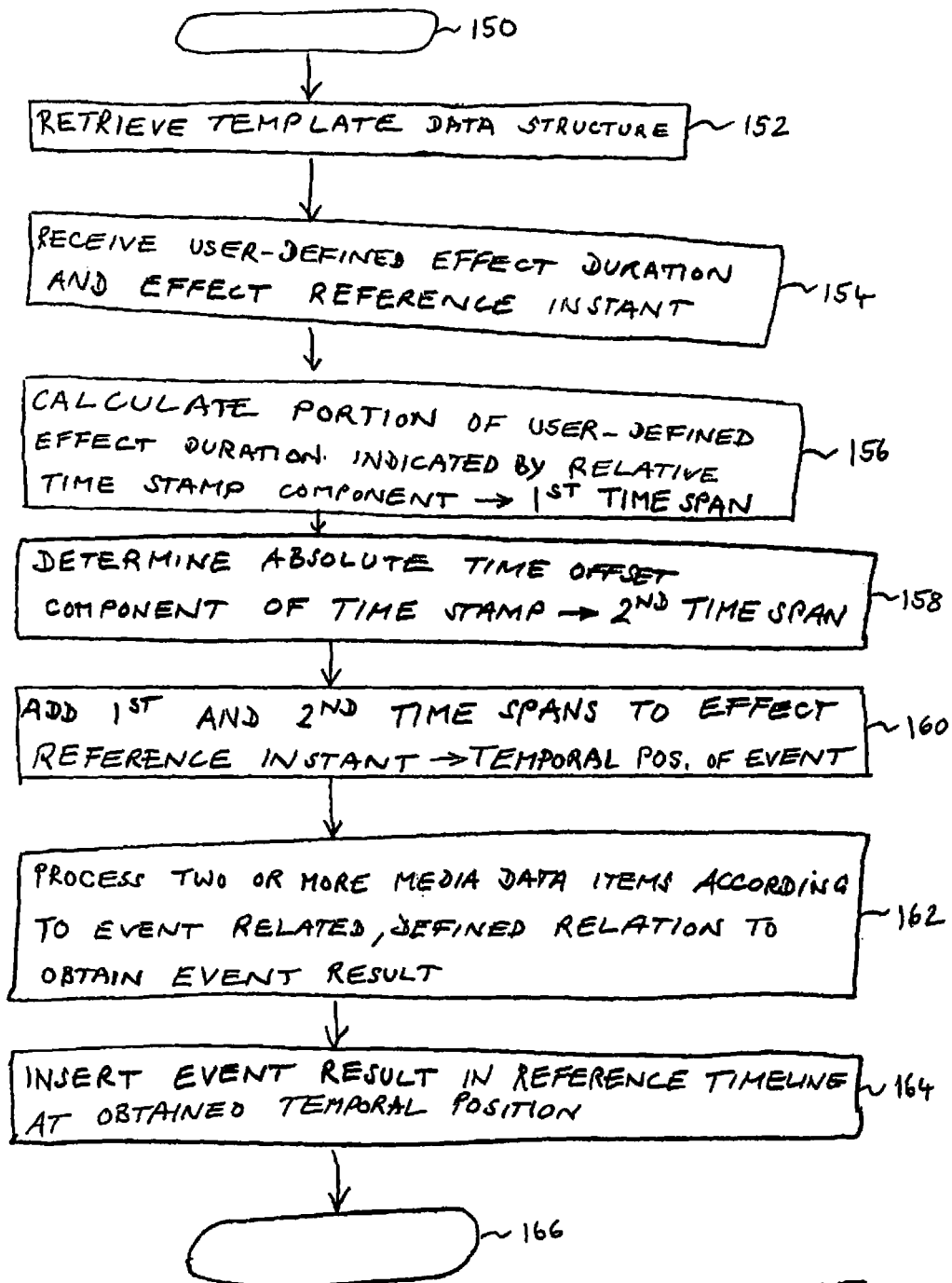
FIG. 15 shows a schematic flowchart of a method of combining two or more media data items according to the teachings disclosed herein.

FIG. 15 shows a schematic flowchart of a method of combining two or more media data items. Such a method may be performed by a computer of an end user of the template data structure provided by a media effect designer. After the start of the method at 150 the template data structure is retrieved at 152. The template data structure may for example be provided on a storage medium such as a CD-ROM, a DVD, or over a communication network. At an action 154, a user-defined effect duration and an effect reference instant is received from the end user via a suitable interface. Typically, the template data structure will be represented by a graphical object visible on a graphical user interface so that the end user may move the graphical object to a desired position within a graphically represented reference timeline by means of e.g. a pointing device. The end user may also adjust the user-defined effect duration by enlarging the graphical object representing the template data structure with the pointing device. In the alternative, the user could use a keyboard to enter numerical values corresponding to the user-defined effect duration and the effect reference instant.

For each timestamp that is defined in the template data structure, a portion of the user-defined effect duration is calculated as indicated by the relative timestamp component of the timestamp under consideration (action 156). This calculation yields a first time span that will be used during subsequent calculations. A second time span is obtained by determining the absolute time offset component of the timestamp under consideration at 158. The first and second time spans are added to the effect reference instant at 160, which yields the temporal position of the event corresponding to the timestamp.

At an action 162 the two or more media data items are processed according to an event-related, defined relation in order to obtain a result of the event. At 164 the event result is inserted into a reference timeline at the temporal position obtained at the action 160. Then the method ends at 166. The method may be repeated from action 156 for further events and their corresponding timestamps so that the results of these events may also be inserted into the reference timeline at the correspondingly obtained temporal positions.

Figure 16:
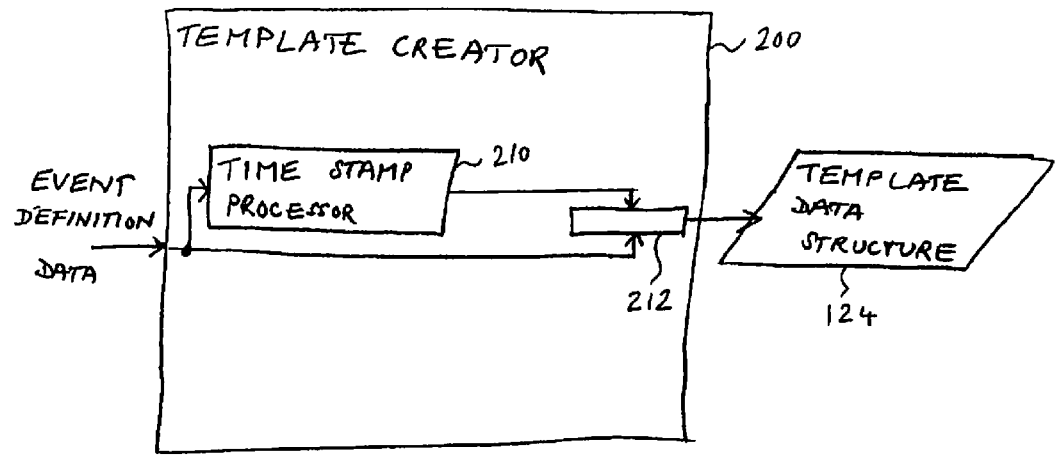
FIG. 16 shows a schematic block diagram of a template creator according to the teachings disclosed herein.

FIG. 16 shows a schematic block diagram of a template creator 200 according to the teachings disclosed herein. The template creator 200 receives event definition data which may be provided by a media effect designer. A timestamp processor 210 extracts timestamp-related data from the event definition data and processes it to obtain a timestamp with a relative timestamp component and an absolute time offset component. A remainder of the event definition data is forwarded directly to combining module 212 which outputs the template data structure 124 or a part thereof.

Figure 17:
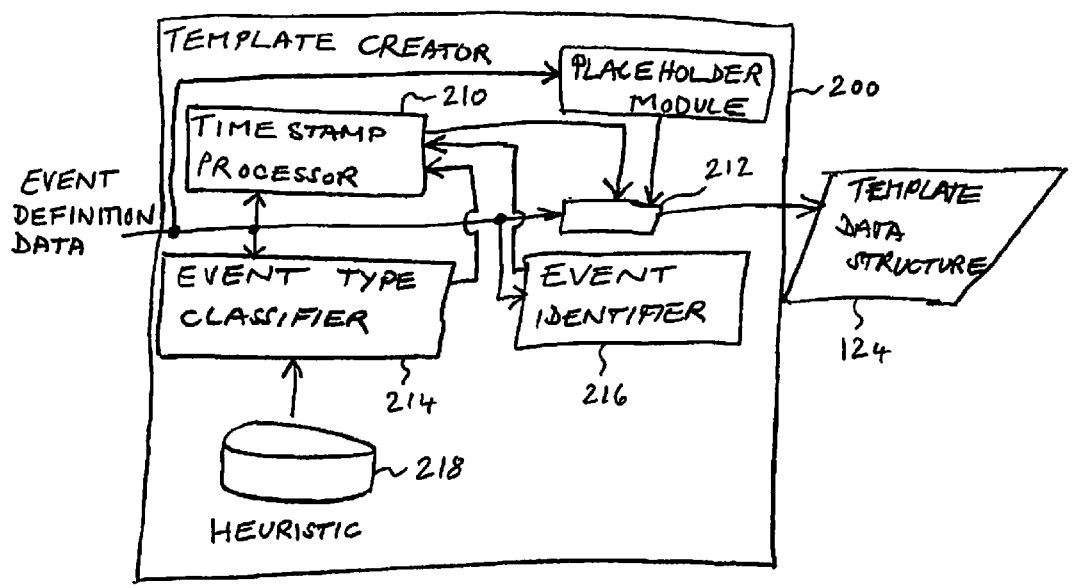
FIG. 17 shows a schematic block diagram of an embodiment of a template creator having further, optional features.

FIG. 17 shows another possible implementation of the template creator 200. The template creator 200 shown in FIG. 17 also comprises a timestamp processor 210 and a combining module 212. In addition, the template creator 200 shown in FIG. 17 comprises an event type classifier 214, an event identifier 216, a heuristic 218, and a placeholder module 220.

The event type classifier 214 receives the event definition data or a part thereof. On the basis of the event definition data the event type classifier 214 determines how a temporal position at which the event should occur during the media effect is calculated. In particular, the event type classifier 214 determines how the temporal position of the event can be expressed as a function of the relative timestamp component and the absolute time offset component of the event's timestamp. An analysis performed by the event type classifier 214 may comprise an examination of a type of the event, such as a mark-in event or a mark-out event for one of the media data items of the media effect. The event type classifier 214 may receive information about possible event types and their typical properties with respect to their temporal positions from a heuristic 218. The heuristic 218 may be a database containing information about calculation rules for the temporal position of a number of different event types. The heuristic 218 may comprise predefined rules, but also corrections introduced by a media effect designer to an automatically determined calculation rule, because the media effect designer was of the opinion that the automatically determined calculation rule did not exactly reflect his/her needs. The heuristic 218 may comprise information about the event type and the calculation rule for the temporal position of the event, but also additional data, such as information about further events in the temporal vicinity of the given event and the type of media effect that the event was used in.

The event identifier 216 has a similar function as the event type classifier 214. The functionality of the event identifier 216 could thus also be included in the event type classifier 214, but has been illustrated separately in FIG. 17 for the sake of clarity. The event identifier 216 is adapted to identify at least one major event, i.e. whether the given event qualifies as a major event within the media effect. The result of a qualification as a major event could be that other events in the temporal vicinity of the major event are bound to the major event so that they are in a defined temporal relation to the major event. The event identifier 216 may also identify a priority of the event, in case a more elaborate event hierarchy is employed.

The template creator 200 shown in FIG. 17 also comprises the placeholder module 220, which converts a corresponding entry in the event definition data to a data element and transmits this data element to the combining module 212. For example, the placeholder module 220 may insert a default name for a media data item into the template data structure 124 via the combining module 212. The default name for the media data item can then be searched by a software or computer program running on a computer of an end user to be replaced with a user-defined file name and path.

Figure 18:
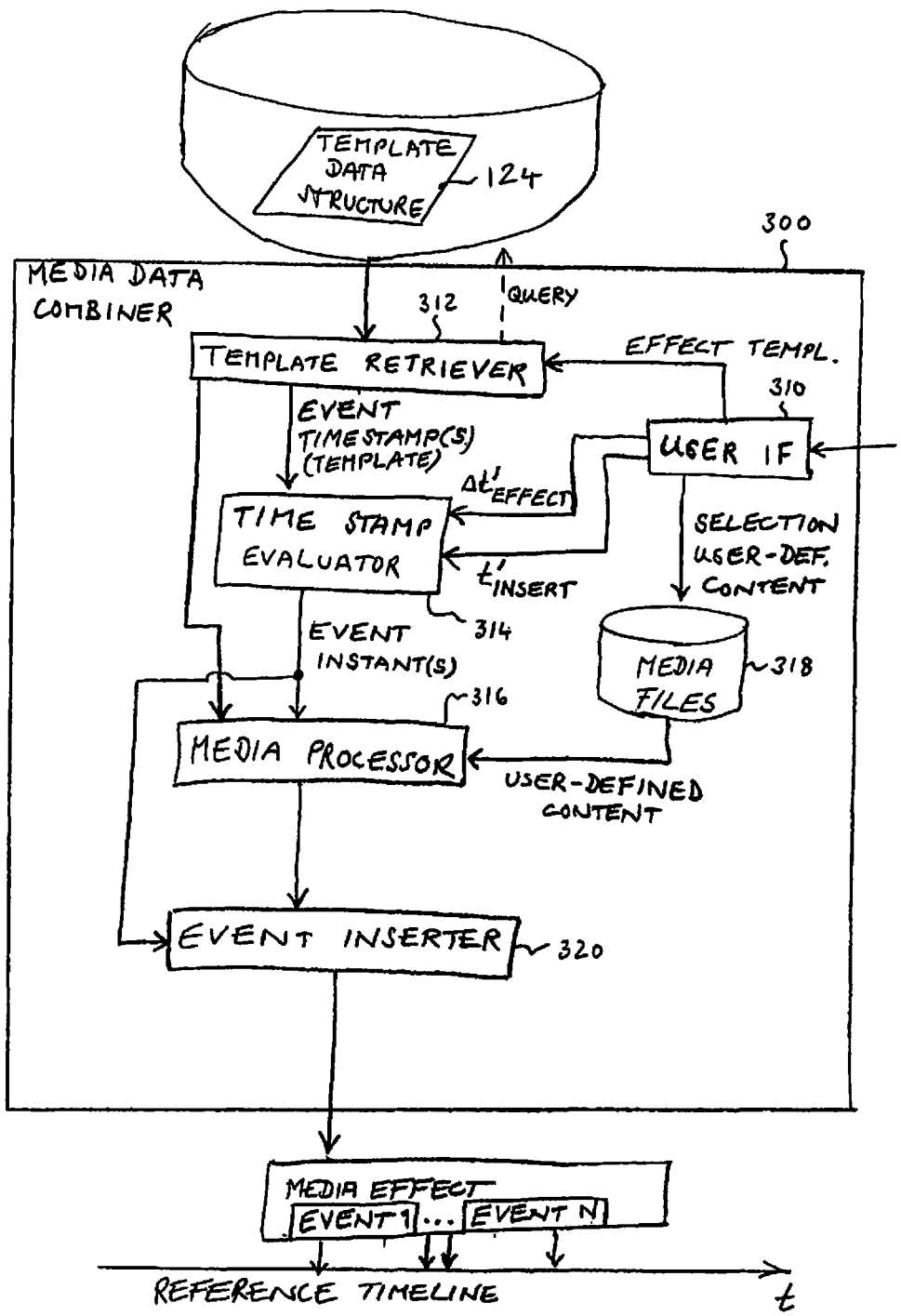
FIG. 18 shows a schematic block diagram of a media data combiner according to the teachings disclosed herein.

FIG. 18 shows a schematic block diagram of a media data combiner 300 that is typically running on a computer of an end user of a media editing software. A user wishing to add a specific media effect to one of his/her media editing projects selects one of a plurality of effects according to his needs and preferences. The selection is received by a user interface 310 of the media data combiner 300. The information about the selected effect is forwarded from the user interface 310 to a template retriever 312 which sends a query to a storage or a database containing a plurality of effect templates in the form of template data structures 124. The template data structure 124 corresponding to the selected effect is returned to the template retriever 312. One or more event timestamps are extracted from the template data structure 124 and provided to a timestamp evaluator 214. Information contained in the template data structure 124 is also provided to a media processor 316. The timestamp evaluator 314 further receives a user-defined media effect duration $\Delta t'_{effect}$ and a user-defined insertion instant $t'_{insert}$ from the user interface 310. The user-defined media effect duration and the insertion instant may be chosen by the user via a graphical user interface and a pointing device, for example. The timestamp evaluator determines the one or more event instances on the basis of the relative timestamp component, the absolute time offset component, the insertion instant $t'_{insert}$ and the media effect duration $\Delta t'_{effect}$. The event instant(s) is/are provided to the media processor 316, which uses the event instant(s) for rendering the media effect.

The user typically also defines which ones of the media data items (movie clips, still images, sounds, computer-generated images, etc.) shall be used within the media effect. To this end, the user interface 310 forwards a selection of the user defined content to a media file storage 318. The media file storage 318 provides the user-defined content to the media processor 316. The user-defined content may be a file name and file path to a file containing the actual user-defined content which may be accessed at a later stage when the media editing software of the user compiles a result of the editing project. In an exemplary implementation, the media processor 316 may replace a default placeholder with the user-defined content for a reference to the user-defined content such as a file name and file system path.

The following example is included to illustrate how the timestamp evaluator 314 processes the data provided from the template data structure 124 and the user interface 310. Assume the template data structure is a file in the format XML (eXtended Markup Language). It comprises the following section defining a picture-in-picture (PiP) effect:

```
<Source start_PiP_Timestamp="0.2+0"
        stop_PiP_Timestamp="0.8+0">
    <Content desc="File Content" type="File">
        <MediaFileConfig PiP_AssetIdx="2"
                PiP_PlaceHolderName="..\Placeholders\Placeholder-
                2_S.png"
                idx="0"
                mStart_PiP_Timestamp="0.0+0"
                mStop_PiP_Timestamp="0.6+0" />
    </Content>
    <Effect prio="0" GUID="{52F11589-C16B-4465-A33A-
                930F55F9C8B4}"
            start_PiP_Timestamp="0.2+0"
            stop_PiP_Timestamp="0.8+0">
        <PropConfig>
            <DynamicPropSets>
                <DynamicPropSet position="0.0">
                    <PropertySet>
                        <Property name="Anchor Point" interp="Linear"
                                type="Position" idx="0">
                            <Value type="DOUBLE" name="valueX">
                                0.5
                            </Value>
                            <Value type="DOUBLE" name="valueY">
                                0.5
                            </Value>
                        </Property>
                    </PropertySet>
                </DynamicPropSet>
            </DynamicPropSets>
        </PropConfig>
    </Effect>
</Source>
```

Now assuming that the end user has:

set the PiP duration to 100 seconds, set the start instant of the PiP effect to 30 seconds, and selected the clip "MyClip01" in the directory "D:\MyClips\" as one of the media data items, the bold sections of above XML-file are modified by the method of combining and/or the media data combiner to:

```
<Source start_PiP_Timestamp="50"
    stop_PiP_TimeStamp="110">
.
.
    mStart_PiP_Timestamp="0"
    mStop_PiP_TimeStamp="60"
.
.
    PiP_PlaceHolderName="D:\MyClips\MyClip01" .
```

The units of the timestamp values are seconds.

The media processor 316 provides its output to an event inserter 320. The event inserter 320 also receives the event instant(s) from the timestamp evaluator 314. The event inserter 320 adds the events as defined by the media effect to a reference timeline, using the results provided by the media processor 316 and the event instant(s) from the time stamp evaluator 314.

Figure 19:
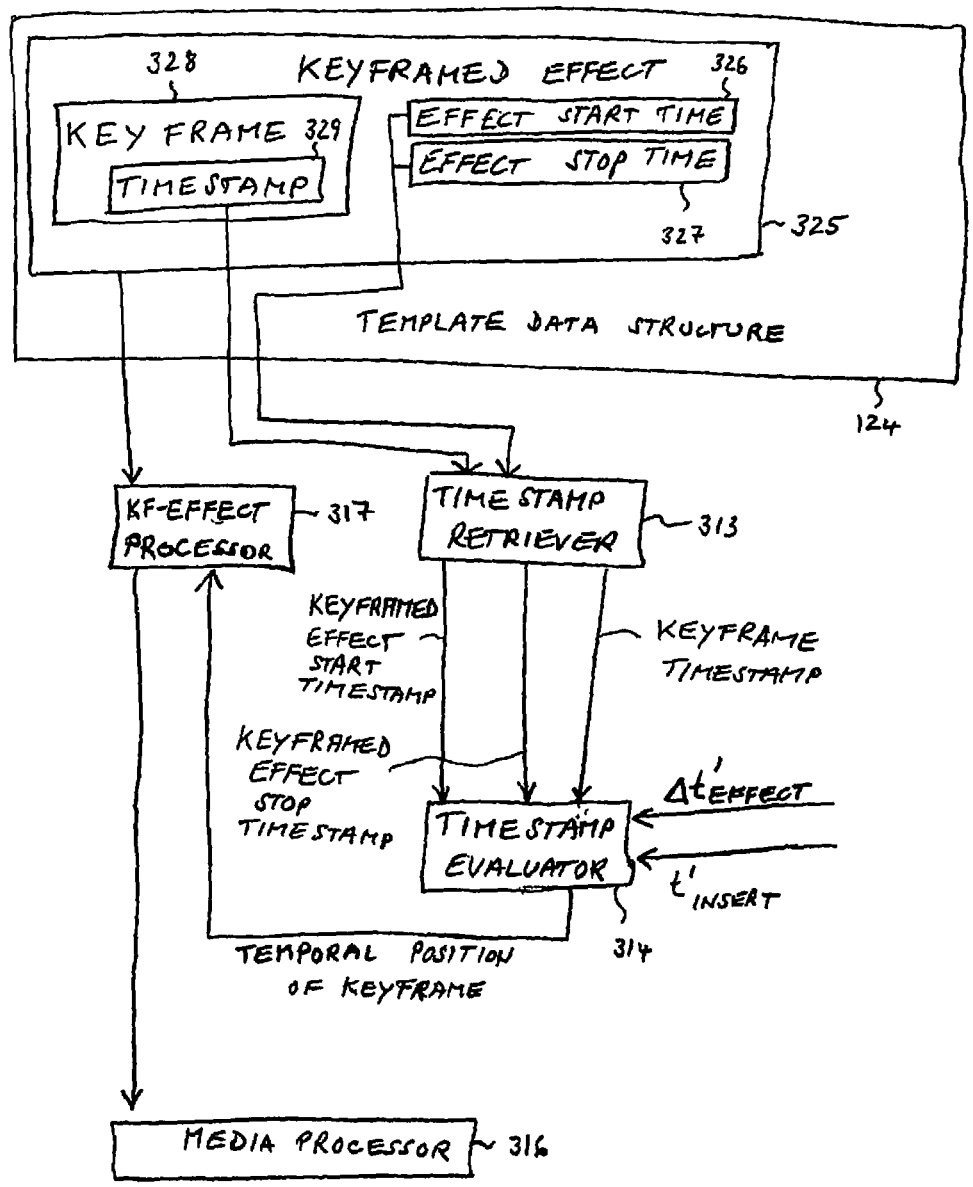
FIG. 19 shows a schematic block diagram of an optional effect of the media data combiner.

FIG. 19 shows a schematic block diagram illustrating how keyframes within a keyframed effect may be handled by the media data combiner 300 and the timestamp evaluator 314. The template data structure 124 comprises a section dedicated to a keyframed effect 325. The keyframed effect 325 has a start time 326 and a stop time 327 which are defined relative to the encompassing media effect. Furthermore, the keyframed effect section 325 comprises at least one keyframe 328 with a corresponding timestamp 329.

The keyframed effect start time 326, the keyframed stop time 327, and the keyframe timestamp 329 are retrieved by a timestamp retriever 313 that is part of the media data combiner 300. The corresponding timestamps are forwarded to the timestamp evaluator 314 which determines a temporal position of the keyframe 328 on the basis of the timestamps and the user-defined media effect duration $\Delta t'_{effect}$ and the insertion instant $t'_{insert}$. The timestamp evaluator 314 may detect that the timestamp 329 belongs to a keyframe 328. This may mean that the calculation of the temporal position of the keyframe is slightly different from the calculation of the temporal position for a normal timestamp. In particular, the timestamp 329 of the keyframe 328 is typically defined relative to the keyframed effect 325 and the duration thereof. This definition of the keyframed timestamp 329 is in accordance with the timestamp definition in many predefined, standard keyframed effects so that these predefined, standard keyframed effects may be used in the media effect defined by the template data structure 124. For keyframe positions there are no absolute timestamps used, but relative positions within the keyframed effect. Therefore, the formula for calculating the temporal position is slightly different:

Final time for reference timeline ==

$$\frac{(t_{InsertPosition} + x \cdot t_{Overall\_PiP\_Duration} + y - t_{AbsoluteEffectStartTime})}{t_{AbsoluteEffectStopTime} - t_{AbsoluteEffectStartTime}}$$

The times $t_{absolute\ effect\ start\ time}$ and $t_{absolute\ effect\ stop\ time}$ have to be retrieved from the enclosing keyframed effect.

In the alternative, a keyframe timestamp could be evaluated using the following formula:

$$t_{reference\ timeline} = t_{KF\ start} + x \cdot (t_{KF\ stop} - t_{KF\ start}) + y$$

The temporal position of the keyframe determined by the timestamp evaluator 314 is provided to a keyframed effect processor 317 which determines a result of the keyframed effect taking into account the determined temporal positions of the keyframes. The result of the keyframed effect processor 317 is provided to the media processor 316.

The following tables show some exemplary entries in an XML file containing the picture-in-picture template definition before and after a modification by an end user. The first table illustrates the replacing of a reference to a media file.

| Examples: Placeholder in PiP template | Final timeline for editing engine |
|---|---|
| <MediaFileConfig PiP_PlaceHolderName= "placeholder1.png" ...> | Before any media file has been dropped on this placeholder: <MediaFileConfig name="placeholder1.png" ...> After "First Picture.jpg" has been dropped on this placeholder: <MediaFileConfig name="C:\First Picture.jpg" ...> |
| <MediaFileConfig PiP_PlaceHolderName= "..\std_placehold2.png" ...> | Before any media file has been dropped on this placeholder: <MediaFileConfig name="..\std_placehold2.png" ...> After "Second Picture.jpg" has been dropped on this placeholder: <MediaFileConfig name="C:\Second Picture.jpg" ...> |

The following table illustrates some examples of the calculation of the temporal position with reference to the reference timeline.

EXAMPLES

Values used here:
$t_{InsertPosition}$=1 minute=60 seconds
$t_{Overall\_PiP\_Duration}$=10 seconds

| Placeholder in PiP template | Final timeline for editing engine |
|---|---|
| A source from beginning to end: | |
| <Source start_PiP_TimeStamp="0.0+0" stop_PiP_TimeStamp="1.0+0"> | <Source start="60" stop="70"> |
| A source from the middle to 2 seconds before the end: | |
| <Source start_PiP_TimeStamp="0.5+0" stop_PiP_TimeStamp="1.0-2"> ... | <Source start="65" stop="68"> ... |

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A method for execution by a hardware apparatus, a microprocessor, a programmed computer, or an electronic circuit and for creating a template data structure for a media effect involving at least one media data item to be presented during a presentation of the media effect, the method comprising:
    defining a time stamp for an event of the template data structure, the time stamp comprising
        a relative time stamp component indicating a time span within the presentation of the media data item as a portion of a duration of the presentation, and
        an absolute time offset component indicating a time span independent from the duration of the presentation of the media effect;
    determining an event type by determining whether a given event is to occur at a temporal position that is defined as a fraction of the duration of the presentation, or whether the given event is to occur at a certain temporal distance from another event; and
    setting the relative time stamp component and the absolute time offset of the time stamp corresponding to the given event as a function of a result of the determining action.

2. The method according to claim 1, wherein the determining of the event type is based on a heuristic.

3. The method according to claim 1, wherein the setting of the relative time stamp component and the absolute time offset comprises:
    identifying at least one major event of the template data structure;
    determining a temporal distance between the given event and the major event;
    comparing the determined temporal distance with a threshold;
    setting the relative time stamp component of the given event equal to the relative time stamp component of the major event and setting the absolute time offset of the given event equal to the determined temporal distance if the determined temporal distance is less than the threshold; and
    setting the relative time stamp component of the given event equal to a portion of the duration of the presentation that corresponds to the temporal position of the given event and setting the absolute time offset equal to zero if the determined temporal distance is greater than or equal to the threshold.

4. The method according to claim 3, wherein at least two major events have different priorities and wherein a time stamp of a lower prioritized major event of the at least two major events is defined as a function of a higher prioritized major event of the at least two major events.

5. The method according to claim 1, further comprising:
    defining a key-framed effect to be executed within the media effect;
    defining a key-framed effect start time and a key-framed effect stop time in the format of the time stamp for an event, a difference between the key-framed effect stop time and the key-framed offset start time yielding a key-framed effect duration;
    defining a key frame time stamp of a key frame within the key-framed effect, the key-framed time stamp comprising a relative time stamp component indicating a time span within the key-framed effect as a portion of the key-framed effect duration and an absolute time offset component indicating a time span independent from the key-framed effect duration.

6. The method according to claim 1, further comprising:
    defining a place holder for a reference to the media data item, the place holder comprising a reference to a default media data item adapted to be replaced with the reference to said media data item upon a corresponding action of a user of the template data structure.

7. The method according to claim 1, wherein media effect comprises at least one of a picture-in-picture effect, a crossfade effect, a split-screen effect, a dissolve effect, an overlay effect, a superimpose effect, and an effect with a single media data item and a background.

8. The method according to claim 1, wherein the media effect involves at least two media data items to be presented substantially simultaneously in a defined relation to each other.

9. Computer readable non-transistory digital storage medium having stored thereon a computer program having a program code for performing, when running on a computer, a method of creating a template data structure for a media effect involving at least one media data item to be presented during a presentation of the media effect, the method comprising:
  defining a time stamp for an event of the template data structure, the time stamp comprising
    a relative time stamp component indicating a time span within the presentation of the media data item as a portion of a duration of the presentation, and
    an absolute time offset component indicating a time span independent from the duration of the presentation of the media effect;
  determining an event type by determining whether a given event is to occur at a temporal position that is defined as a fraction of the duration of the presentation, or
  whether the given event is to occur at a certain temporal distance from another event; and
  setting the relative time stamp component and the absolute time offset of the time stamp corresponding to the given event as a function of a result of the determining action.

10. A template creator for creating a template data structure for a media effect involving at least one media data item to be presented during a presentation of the media effect, the template creator comprising:
  a time stamp processor adapted to define a time stamp for an event of the template data structure, the time stamp comprising a relative time stamp structure which indicates a time span within the presentation of the media data item as a portion of a duration of the presentation, and an absolute time offset component which indicates a time span independent from the duration of the presentation wherein the time stamp processor is further adapted to assign the defined time stamp to a given event and to set the relative time stamp component and the absolute time offset component of the time span to normalized values valid for the given event; and
  an event type classifier adapted to determine an event type of the given event by determining whether the given event is to occur at a temporal position that is defined as a fraction of the duration of the presentation, or whether the given event is to occur at a pre-defined temporal distance from another event;
  wherein the time stamp processor is further adapted to set the relative time stamp component and the absolute time offset component corresponding to the given event as a function of a result of the determining action.

11. The template creator according to claim 10, wherein the event type classifier is based on a heuristic.

12. The template creator according to claim 10, further comprising:
  an event identifier adapted to identify at least one major event of the template data structure; a temporal distance determiner adapted to determine a temporal distance between the given event and the at least one identified major event;
  a comparator adapted to compare the determined temporal distance with a threshold;
  wherein the time stamp processor is further adapted to set the time stamp of the given event as depending on the relative time stamp component of the time stamp of the major event if the temporal distance is less than the threshold.

13. The template creator according to claim 12, wherein at least two major events have different priorities and wherein the time stamp processor is adapted to set a time stamp of a lower prioritised event of the at least two major events as a function of a higher prioritised major event of the at least two major events.

14. The template creator according to claim 10, further comprising a key-framed effect creator adapted to define a key-framed effect to be executed within the media effect,
  to define a key-framed effect start time and a key-framed effect stop time in the format of the time stamp for an event, a difference between the key-framed effect stop time and the key-framed effect start time yielding a key-framed effect duration, and
  to define a key frame time stamp of a key frame within the key-framed effect, the key frame timestamp comprising a relative time stamp component indicating a time span within the key-framed effect as a portion of the key-framed effect duration and an absolute time offset component indicating a time span independent from the key-framed effect duration.

15. The template creator according to claim 10, further comprising a placeholder module adapted to define a placeholder for a reference the media data item, the placeholder comprising a reference to a default media data item adapted to be replaced with the reference to said media date item upon a corresponding action of a user of the template data structure.

16. The template creator according to claim 10, wherein the media effect comprises at least one of:
  a picture-in-picture effect, a crossfade effect, a split screen effect, a dissolve effect, an overlay effect, a superimpose effect, and an effect with a single media data item and a background.

17. The template creator according to claim 10, wherein the media effect involves at least two media data items to be presented substantially simultaneously in a defined relation to each other.

18. A method of processing at least one media data item to be presented during a presentation of a media effect involving the media data item, the method comprising:
  retrieving a template data structure comprising a time stamp for an event of the template data structure, the time stamp comprising a relative time stamp component indicating a time span within the presentation of the media data item as a portion of a duration of the presentation, and an absolute time offset component indicating a time span independent from the duration of the presentation;
  receiving a user-defined presentation duration and a presentation reference instant with respect to a reference timeline to which the event is to be assigned;
  determining a temporal position of the event relative to the reference timeline, the determining comprising:
    determining a first time span by calculating a portion of the user-defined presentation duration, the portion being indicated by the relative time stamp component of the time stamp corresponding to the event;
    determining a second time span indicated by the absolute time offset component of the time stamp corresponding to the event; and adding the first time span and the second time span to the presentation reference instant to obtain the temporal position of the event;

the method of combining further comprising:

inserting the event in the reference timeline at the obtained temporal position of the event.

19. The method according to claim 18, wherein the determining of the temporal position of the event relative to the reference timeline comprises evaluating the following formula:

$$t_{event} = t_{Insert\ Position} + x \cdot t_{presentation\ duration} + y,$$

where $t_{event}$ is the temporal position of the event relative to the reference timeline, $t_{InsertPosition}$ is the user-defined presentation reference instant, x is the relative time stamp component, y is the absolute time offset component, and $t_{presentation\ duration}$ is the user-defined presentation duration.

20. The method according to claim 18, wherein the presentation comprises a key-framed effect to be executed during the presentation, the method further comprising:

retrieving a key-framed effect start time stamp, a key-framed effect stop time stamp and a key frame time stamp of a key frame within the key-framed effect from the template data structure;

determining a key-framed effect start time and a key-framed effect stop time in a manner analogous to the determining of the temporal position of the event relative to the reference timeline;

evaluating the key-framed time stamp by determining a key-framed effect duration as a function of the key-framed effect stop time and the key-framed effect start time, by determining a third time span by calculating a portion of the key-framed effect duration, the portion being indicated by the relative time-stamp component of the key frame time stamp, by further determining a fourth time span indicated by the absolute time offset component of the key frame time stamp, and by adding the third time span and the fourth time span to the determined key-framed effect start time to obtain a temporal position of the key frame relative to the reference timeline.

21. The method according to claim 18, wherein the presentation comprises a standard effect, the method comprising:

evaluating timestamps of standard effect events occurring during the standard effect by determining a standard effect start time, a standard effect stop time, and a standard effect duration as a function of the user-defined presentation duration and the presentation instant with respect to the reference timeline, and by evaluating relative time indications defined in the time stamps for the standard effect events as a function of the standard effect duration.

22. The method according to claim 18, further comprising:

receiving a reference to a user-defined media data item and an information about a user-defined target for the user-defined media data item;

searching for a place holder corresponding to the user-defined target in the template data structure; and replacing the place holder with the reference to the user-defined media data item.

23. The method according to claim 18, wherein the media effect comprises at least one of a picture-in-picture effect, a cross-face effect, a dissolve effect, a split screen effect, an overlay effect, a superimpose effect, and an effect with a single media data item and a background.

24. The method according to claim 18, wherein the media effect involves at least two media data items to be presented substantially simultaneously in a defined relation to each other and wherein processing the at least one media data item comprises combining the at least two media data items and processing the at least two media data items according to an event-related, defined relation to obtain a result of the event.

25. Computer readable non-transitory digital storage medium having stored thereon a computer program having a program code for performing, when running on a computer, a method of processing at least one media data item to be presented during a presentation of a media effect involving the media data item, the method comprising:

retrieving a template data structure comprising a time stamp for an event of the template data structure, the time stamp comprising a relative time stamp component indicating a time span within the presentation of the media data item as a portion of a duration of the presentation, and an absolute time offset component indicating a time span independent from the duration of the presentation;

receiving a user-defined presentation duration and a presentation reference instant with respect to a reference timeline to which the event is to be assigned;

determining a temporal position of the event relative to the reference timeline, the determining comprising:

determining a first time span by calculating a portion of the user-defined presentation duration, the portion being indicated by the relative time stamp component of the time stamp corresponding to the event;

determining a second time span indicated by the absolute time offset component of the time stamp corresponding to the event; and adding the first time span and the second time span to the presentation reference instant to obtain the temporal position of the event;

the method of combining further comprising:

processing the media data item according to an event-related, defined relation to obtain a result of the event; and inserting the result of the event in the reference timeline at the obtained temporal position of the event.

26. A media data processor for processing a media data item to be presented during a presentation of a media effect involving the media data item, the media data processor comprising:

a template retriever adapted to retrieve a template data structure comprising a time stamp for an event of the template data structure, the time stamp comprising a relative time stamp component which indicates a time span within the presentation of the media data item as a portion of a duration of the presentation and an absolute time offset component which indicates a time span independent from the duration of the presentation;

an interface for receiving a user-defined presentation duration and a presentation reference instant with respect to a reference timeline to which the event is to be assigned;

a time stamp evaluator adapted to determine a temporal position of the event relative to the reference timeline, adapted to determine a first time span by calculating a portion of the user-defined presentation duration, the portion being indicated by the relative time span component of the timestamp corresponding to the event, adapted to determine a second time span indicated by the absolute time offset component of the time stamp corresponding to the event, and further adapted to add the first time span and the second time span to the presentation reference instant to obtain the temporal position of the event with respect to the reference timeline;
a media processor adapted to process the media data item according to an event-related defined manner to obtain a result of the event; and
an event inserter adapted to insert the result of the event in the reference timeline at the obtained temporal position of the event.

27. The media data processor according to claim 26, wherein the time stamp evaluator is adapted to determine the temporal position according to the following formula:

$$t_{event} = t_{Insert\ Position} + x \cdot t_{presentation\ duration} + y,$$

where
$t_{event}$ is the temporal position of the event relative to the reference timeline,
$t_{InsertPosition}$ is the user-defined presentation reference instant,
x is the relative time stamp component,
y is the absolute time offset component, and
$t_{presentation\ duration}$ is the user-defined presentation duration.

28. The media data processor according to claim 26 further comprising:
an effect processor adapted to process a key-framed effect to be executed during the presentation;
a timestamp retriever adapted to retrieve a key-framed effect start timestamp, a key-framed effect stop timestamp, and a key frame timestamp of a key frame within the key-framed effect from the template data structure;
wherein the time stamp evaluator is further adapted to determine a key-framed effect start time and a key-framed effect stop time in a manner analogue to the determining of the temporal position of the event relative to the reference timeline, and adapted to evaluate the key frame timestamp by determining a key-framed effect duration as a function of the key-framed effect stop time and the key-framed effect start time, determining a third time span by calculating a portion of the key-framed effect duration, the portion being indicated by the relative time stamp component of the key frame timestamp, by further determining a fourth time span indicated by the absolute time offset component of the key frame timestamp, and by adding the third time span and the fourth time span to the key-framed effect start time to obtain a temporal position of the key frame with respect to the reference timeline.

29. The media data processor according to claim 26, wherein the presentation comprises a standard effect and the time stamp evaluator is further adapted to evaluate timestamps of standard effect events occurring during the standard effect by determining a standard effect start time, a standard effect stop time, and a standard effect duration as a function of the user-defined presentation duration and the presentation instant with respect to the reference timeline, and by evaluating relative time indications defined in the timestamps for the standard effect events a function of the standard effect duration.

30. The media data processor according to claim 26, further comprising a media data reference interface adapted to receive a reference to a user-defined media data item;
a placeholder seeker adapted to search for a placeholder corresponding to the user-defined target in the template data structure; and
a placeholder modifier adapted to replace the placeholder with the reference to the user-defined media date item.

31. A method for execution by a hardware apparatus, a microprocessor, a programmable computer, or an electronic circuit and for creating a template data structure for a media effect involving at least one media data item to be presented during a presentation of the media effect, the method comprising:
defining a time stamp for an event of the template data structure, the time stamp comprising
a relative time stamp component indicating a time span within the presentation of the media data item as a portion of a duration of the presentation, and
an absolute time offset component indicating a time span independent from the duration of the presentation of the media effect;
defining a key-framed effect to be executed within the media effect;
defining a key-framed effect start time and a key-framed effect stop time in the format of the time stamp for an event, a difference between the key-framed effect stop time and the key-framed offset start time yielding a key-framed effect duration;
defining a key frame time stamp of a key frame within the key-framed effect, the key-framed time stamp comprising a relative time stamp component indicating a time span within the key-framed effect as a portion of the key-framed effect duration and an absolute time offset component indicating a time span independent from the key-framed effect duration.

32. A template creator for creating a template data structure for a media effect involving at least one media data item to be presented during a presentation of the media effect, the template creator comprising:
a time stamp processor adapted to define a time stamp for an event of the template data structure, the time stamp comprising a relative time stamp structure which indicates a time span within the presentation of the media data item as a portion of a duration of the presentation, and an absolute time offset component which indicates a time span independent from the duration of the presentation; wherein the time stamp processor being is further adapted to assign the defined time stamp to a given event and to set the relative time stamp component and the absolute time offset component of the time span to normalized values valid for the given event; and
a key-framed effect creator adapted to define a key-framed effect to be executed within the media effect,
to define a key-framed effect start time and a key-framed effect stop time in the format of the time stamp for an event, a difference between the key-framed effect stop time and the key-framed effect start time yielding a key-framed effect duration, and
to define a key frame time stamp of a key frame within the key-framed effect, the key frame timestamp comprising a relative time stamp component indicating a time span within the key-framed effect as a portion of the key-framed effect duration and an absolute time offset component indicating a time span independent from the key-framed effect duration.

* * * * *